(12) United States Patent
Paulraj

(10) Patent No.: US 7,197,629 B2
(45) Date of Patent: Mar. 27, 2007

(54) COMPUTING OVERHEAD FOR OUT-OF-ORDER PROCESSORS BY THE DIFFERENCE IN RELATIVE RETIREMENT TIMES OF INSTRUCTIONS

(75) Inventor: Dominic Paulraj, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 480 days.

(21) Appl. No.: 10/301,996

(22) Filed: Nov. 22, 2002

(65) Prior Publication Data
US 2004/0103268 A1    May 27, 2004

(51) Int. Cl.
G06F 7/38    (2006.01)
G06F 9/30    (2006.01)

(52) U.S. Cl. .................. 712/227; 703/19
(58) Field of Classification Search .......... 712/227, 712/216, 219; 703/19, 26; 717/130, 124, 717/131, 127; 716/2, 4, 6; 714/37
See application file for complete search history.

(56) References Cited

U.S. PATENT DOCUMENTS

| | | | |
|---|---|---|---|
| 5,546,554 A | 8/1996 | Yung et al. ............... 395/413 |
| 5,838,988 A | 11/1998 | Panwar et al. ......... 395/800.32 |
| 5,860,018 A * | 1/1999 | Panwar ..................... 712/23 |
| 5,958,047 A | 9/1999 | Panwar et al. ............. 712/237 |
| 5,999,727 A | 12/1999 | Panwar et al. ............. 395/566 |
| 6,016,466 A * | 1/2000 | Guinther et al. ............ 702/187 |
| 6,049,868 A | 4/2000 | Panwar .................... 712/244 |
| 6,052,777 A | 4/2000 | Panwar .................... 712/244 |
| 6,058,472 A | 5/2000 | Panwar et al. ............. 712/218 |
| 6,085,305 A | 7/2000 | Panwar et al. .............. 712/23 |
| 6,094,719 A | 7/2000 | Panwar .................... 712/216 |
| 6,195,748 B1 * | 2/2001 | Chrysos et al. ............ 712/227 |
| 6,219,778 B1 | 4/2001 | Panwar et al. .............. 712/23 |
| 6,237,066 B1 | 5/2001 | Pan et al. ................. 711/149 |
| 6,289,465 B1 * | 9/2001 | Kuemerle .................. 713/300 |
| 6,349,406 B1 * | 2/2002 | Levine et al. ............. 717/128 |
| 6,546,548 B1 * | 4/2003 | Berry et al. ............... 717/128 |
| 6,654,938 B2 * | 11/2003 | Kosugi ....................... 716/6 |
| 6,658,654 B1 * | 12/2003 | Berry et al. ............... 717/131 |
| 6,728,955 B1 * | 4/2004 | Berry et al. ............... 717/158 |
| 6,748,555 B1 * | 6/2004 | Teegan et al. .............. 714/38 |
| 6,804,733 B1 * | 10/2004 | Michel et al. .............. 710/68 |
| 6,944,754 B2 * | 9/2005 | Zilles et al. ............... 712/233 |
| 6,978,425 B1 * | 12/2005 | Raghunathan et al. ......... 716/1 |
| 7,043,718 B1 * | 5/2006 | Au et al. .................. 717/127 |
| 2004/0024994 A1 * | 2/2004 | Kurihara et al. ............ 712/227 |

OTHER PUBLICATIONS

Jeffrey Dean et al, ProfileMe: Hardware Support for Instruction-Level Profiling on Out-of-Order Processors, 1997, IEEE.*

* cited by examiner

Primary Examiner—Gilberto Barron
Assistant Examiner—Thomas M. Szymanski
(74) Attorney, Agent, or Firm—Dorsey & Whitney LLP

(57) ABSTRACT

A method of computing overhead associated with executing instructions on an out-of-order processor which includes determining when a first instruction retires, determining when a second instruction retires, and calculating an overhead based upon subtracting when the first instruction retired from when the second instruction retired.

36 Claims, 4 Drawing Sheets

COMPUTING OVERHEAD FOR OUT-OF-ORDER PROCESSORS BY THE DIFFERENCE IN RELATIVE RETIREMENT TIMES OF INSTRUCTIONS

BACKGROUND OF THE INVENTION

1. Field of the Invention

The present invention relates to out-of-order processors and more particularly to computing overhead for out-of-order processors.

2. Description of the Related Art

It is relatively straightforward to determine execution time that an instruction spends in an in-order processor. A younger instruction is issued only after all older instructions have been issued and retired (i.e., completed). Sampling a Program Counter (PC) at a given interval provides statistical time spent on each instruction by comparing when the instruction completes execution (i.e., retires) against when the instruction started execution using the PC. For example, FIG. 1, labeled Prior Art, shows a sequence of three instructions. The first instruction takes 10 cycles to execute, the second instruction starts executing when the first instruction retires and takes 5 cycles to execute and the third instruction starts executing when the second instruction retires, takes 15 cycles to execute and retires after a total of 30 cycles from the beginning of the first instruction to the retiring of the third instruction. Thus, the first instruction uses 10/30 (33.3%) of the total execution time, the second instruction uses 5/30 (16.6%) or the total execution time and the third instruction uses 15/30 (50%) or the total execution time.

However, determining execution time for an instruction when the processor is an OOO (out-of-order) processor is more difficult. When instructions are issued out-of-order, there is no guarantee that a younger instruction is issued after all old instructions are issued and retired. Also, multiple outstanding transactions to memory and parallel replays and rewinds make it difficult to compute the overhead in a program. For example, determining that a program has 12% of total clock cycles attributable to Level 2 cache misses does not provide much insight into what percentage of the total elapsed time is attributed to the Level 2 cache misses. Of the 12% total clock cycles, it is possible that more than 6% of the total clock cycles are attributable to one L2 cache miss.

FIG. 2, labeled Prior Art, shows an example of this issue. In the FIG. 2 example, the first instruction starts executing at clock cycle t and retires at clock cycle t+10. The second instruction starts executing at clock cycle t+2 and retires at clock cycle t+25. The third instruction starts executing at clock cycle t+2 and retires at clock cycle t+30. Thus, the first instruction uses 10/30 (33.3%) of the elapsed time, but 10/61 (16.4%) of the total execution cycles. The second instruction uses 23/30 (76.6%) of the elapsed time, but 23/61 (37.7%) of the total execution cycles. The third instruction uses 28/30 (93.3%) of the elapsed time, but 28/61 (46.6%) of the total execution time. The percentage of total elapsed time is the overhead computation that is desirable to determine. However, this is the computation that is difficult to determine with OOO processors.

SUMMARY OF THE INVENTION

In one embodiment, the invention relates to a method of computing overhead associated with executing instructions on an out-of-order processor which includes determining when a first instruction retires, determining when a second instruction retires, and calculating an overhead based upon subtracting when the first instruction retired from when the second instruction retired.

In one embodiment, the inventions relates to an apparatus for computing overhead associated with executing instructions on an out-of-order processor which includes means for determining when a first instruction retires, means for determining when a second instruction retires, and means for calculating an overhead based upon subtracting when the first instruction retired from when the second instruction retired.

In one embodiment, the invention relates to a system for computing overhead associated with executing instructions on an out-of-order processor which includes a first determining module, a second determining module and an overhead calculating module. The first determining module determines when a first instruction retires. The second determining module determines when a second instruction retires. The overhead calculating module calculates an overhead based upon subtracting when the first instruction retired from when the second instruction retired.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
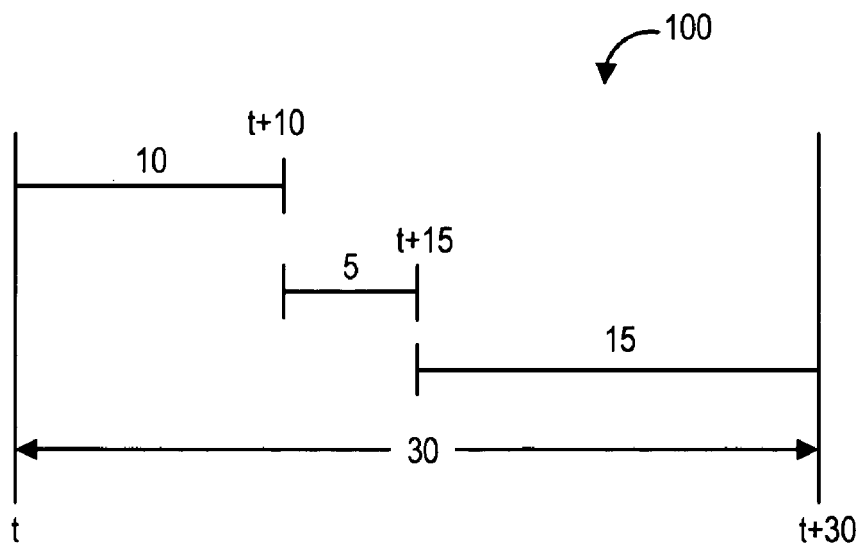
FIG. 1, labeled Prior Art, shows a timing diagram of a sequence of three instructions executing on an in-order processor.
Figure 2:
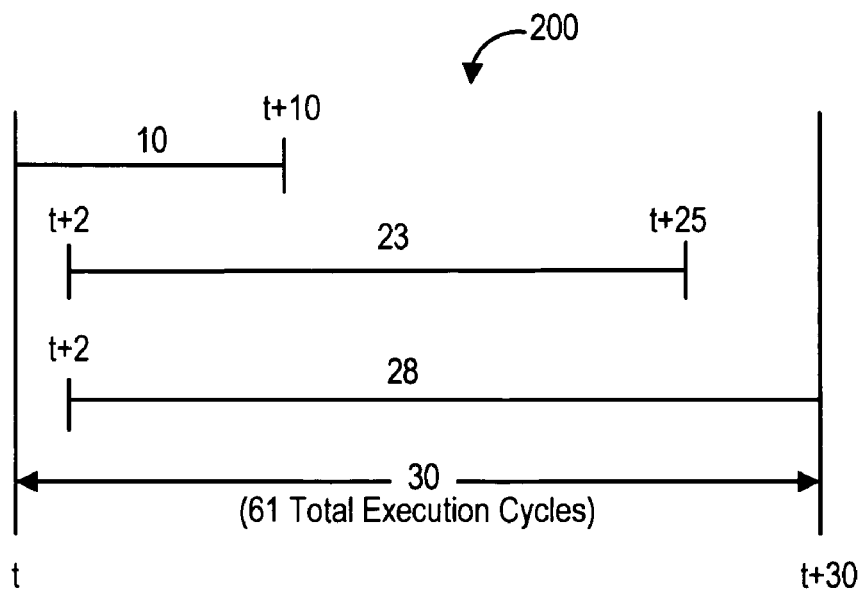
FIG. 2, labeled Prior Art, shows a timing diagram of a set of three instructions executing on an out-of-order processor.
Figure 3:
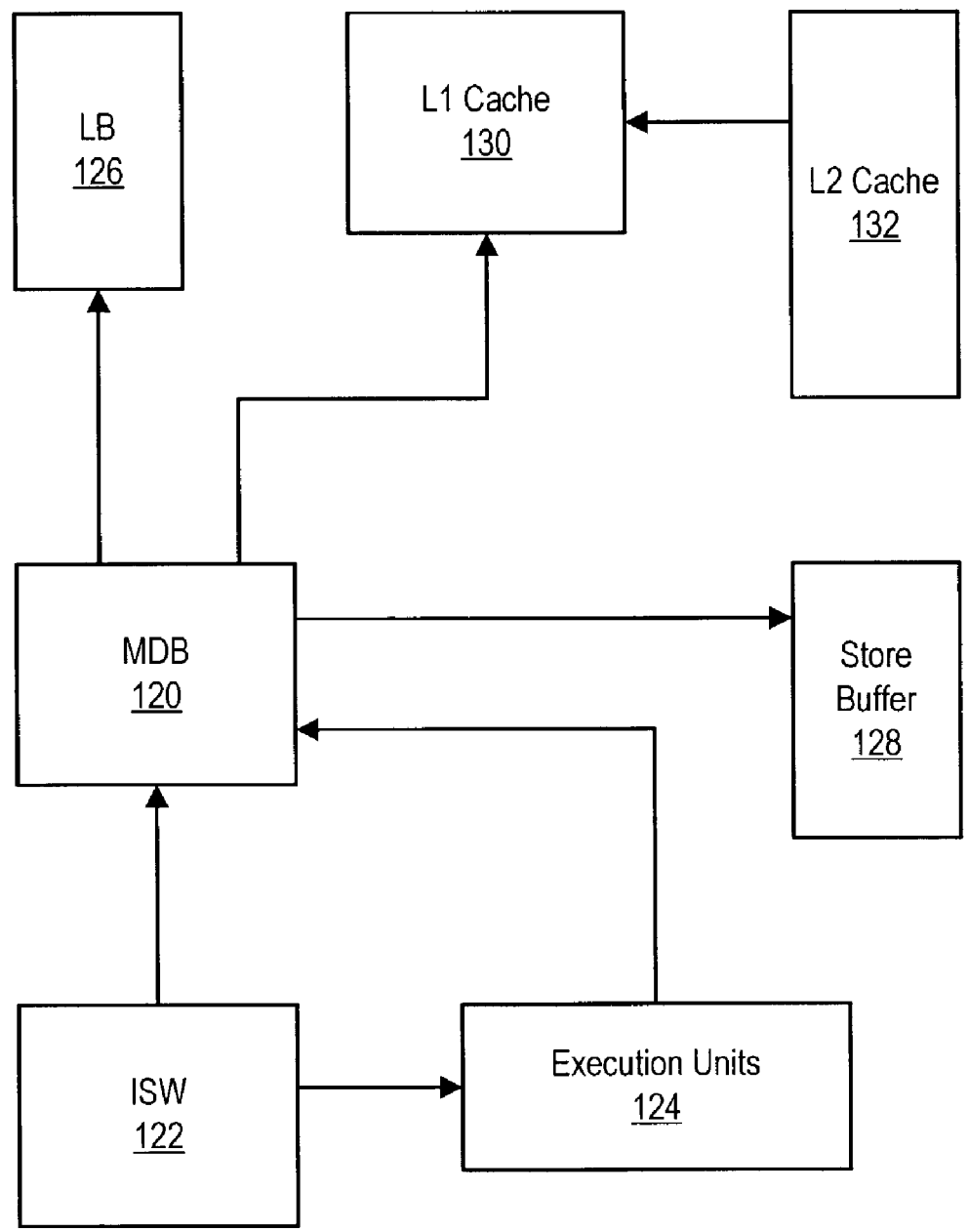
FIG. 3 shows a block diagram of an out-of-order processor in which the execution overhead is computed

Referring to FIG. 3, a block diagram of an example out-of-order (OOO) processor 100 is shown. The out-of-order processor 100 may execute program instructions in an order different from the order present in the user program. When the OOO processor 100 stalls on an instruction, the processor 100 looks ahead and executes instructions provided that the instructions are independent instructions. Even though the OOO processor 100 executes instructions in an out-of-order fashion, completed instructions must retire from the processor in-order. I.e., even if an instruction is completed, the instruction can not retire from the processor 100 if one of the older instructions is not retired. This is to maintain the TSO (Total Store Ordering) constraint.

With the OOO processor 100, the overhead computation is performed based upon precise traps as compared to deferred traps. A precise trap is induced by a particular instruction and occurs before any program visible state has been changed by the trap inducing instruction. A deferred trap is induced by a particular instruction; however, a deferred trap may occur after a program visible state has been changed. Such a state may have been changed by the execution of either the trap inducing instruction itself or by one or more other instructions.

The processor includes Instruction Scheduling Window (ISW) 122 and one or more execution units 124. To achieve out-of-order execution, the processor 100 maintains a plurality of buffers to hold the intermediate results. More specifically, the processor includes a Memory Disambiguation Buffer (MDB) 120, Load Buffer (LB) 126, and a Store Buffer (SB) 128.

Each instruction in the program first gets inserted into the Instruction Scheduling Window 122. The Instruction Scheduling Window 122 is the window that tracks the instruction execution order. Instructions enter and exit from the Instruction Scheduling Window 122. From the Instruction Scheduling Window 122, each instruction that is ready (i.e., all operands for the instruction are available for execution), is accessed and executes via the appropriate execution unit 124 in the processor pipeline. If the instruction is a load or a store instruction, the instruction is also inserted into MDB 120. MDB 120 addresses any TSO constraints. Since loads and stores may get executed in an out-of-order fashion, it is necessary that the loads are provided the latest data either from the appropriate cache or from the appropriate store instruction in the MDB 120.

If a load misses the L1 Cache 130, the request to fill the L1 cache line goes to the Load Buffer 126. Load Buffer 126 issues requests to either the L2 Cache 132 or to memory and installs a line into L1 Cache 130. Once the line gets installed in the L1 Cache 130, the corresponding entry from Load Buffer 126 is released. Until the load completes its execution, the load resides in Load Buffer 126.

Stores are also inserted into the MDB 120. Stores provide data to longer load instructions if the addresses correspond. There are a plurality of conditions imposed in the processor architecture that enable bypassing store data to load. Since the OOO processor 100 looks ahead and execute independent instructions, the processor 100 may execute load instructions which are dependent on older store instructions. A dependency check is performed between instructions based on register entries and not based on memory addresses. Because loads and stores are dependent on each other based on memory address, younger loads potentially get executed before older stores complete. If this condition is detected, the processor 100 recycles the load as an OverEager (OE) load.

Loads can get data either from a cache or from the older stores in the MDB 120. If the load address matches with any of the older stores, the load should get data from the store in the MDB 120. This is called a read after write (RAW) bypass. If the store cannot bypass to the load, then the load gets replayed. This is called RAW recycling.

Figure 4:
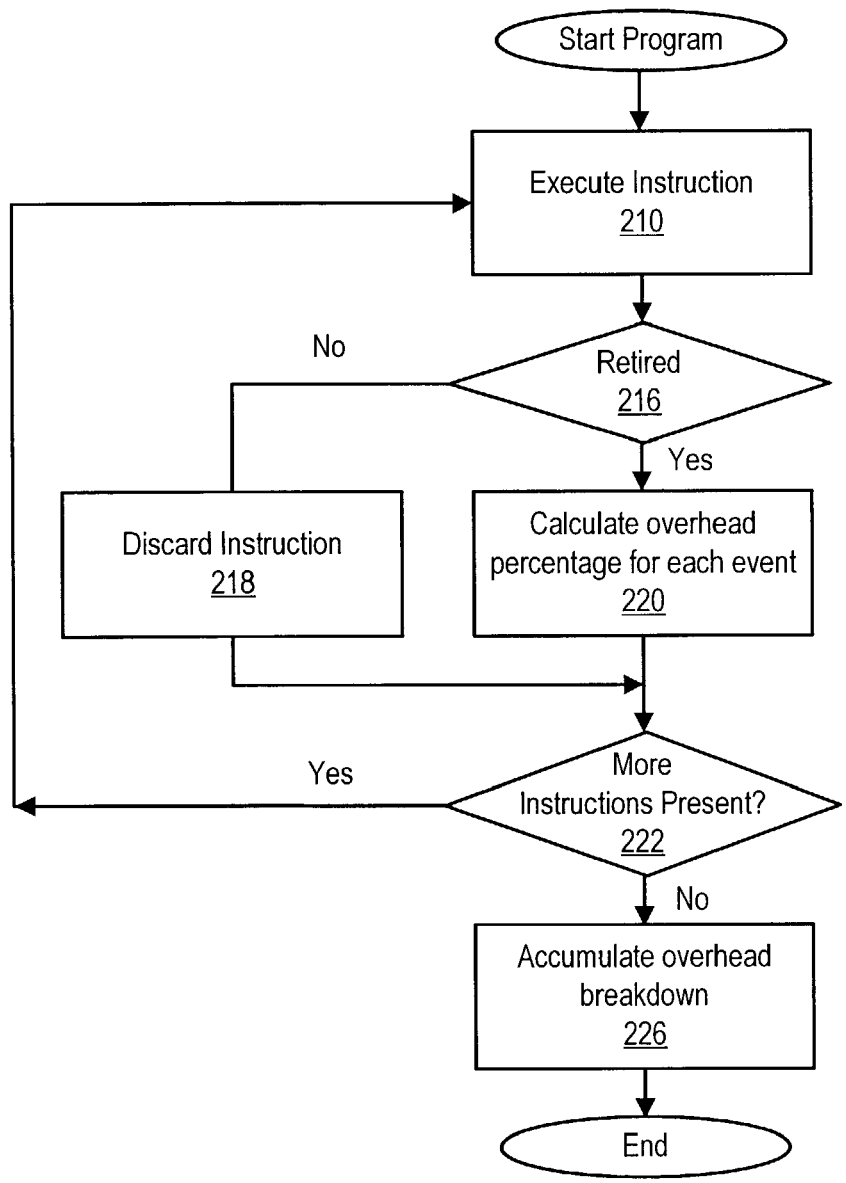
FIG. 4 shows a flow chart of the operation of the method for computing overhead in an out-of-order processor.

Referring to FIG. 4, a flow chart of the operation of the method of computing overhead in an out-of-order processor is shown. More specifically, the method starts by executing an instruction at step 210. The method then determines whether the instruction is retired at step 216. If the instruction is not retired, then the instruction is discarded at step 218.

If the instruction is retired (i.e., the instruction has completed its execution), then the method calculates the overhead percentage for each event of the instruction at step 220. After the overhead percentages are calculated at step 220 then the method determines whether there are any instructions left to execute at step 222. If so, then the method returns to step 210 and the next instruction is executed.

If there are not any more instructions in the program as determined at step 222, then the method accumulates the overhead breakdown for each of the events at step 226 and completes execution.

Accordingly, targeting event counters to only "retired instructions" provides performance bottleneck information for a specific program. This performance bottleneck information enables performance engineers to tune a program.

More specifically, for each instruction in the scheduling window, cycle counts when an event occurs are recorded. When that instruction is in the correct path and gets retired, using the information recorded, the retired latency between two consecutive instructions ($ret_{13}lat$) may be obtained. More specifically, $ret\_lat$ = 'cycle when instruction $x$ retired' – 'cycle when instruction $x-1$ retired'

This retired latency, ret_lat, represents an overhead for the instruction. One cycle out of ret_lat accounts for normal instruction retirement. The remaining amount of cycles (ret_1) represents as overhead.

overhead=(ret_1)

The method 200 computes a plurality of specific event overheads associated with out-of-order processors. More specifically, the method calculates event overheads for the percentage of cycles when MDB 120 was full; the percentage of cycles when MDB 120 read after write recycled; the percentage of cycles when MDB 120 partial read after write recycled; the percentage of cycles when STB partial read after write recycled; the percentage of cycles when LMB 126 is full; the percentage of cycles when a TLB fill event happened; the percentage of cycles when an Over Eager load is recycled; the percentage of cycles when an L1 Cache 130 bank conflict triggers recycling; the percentage of cycles when the TLB was busy; and the percentage of cycles when a load instruction is waiting for data in the L1 Cache 130.

Figure 5:
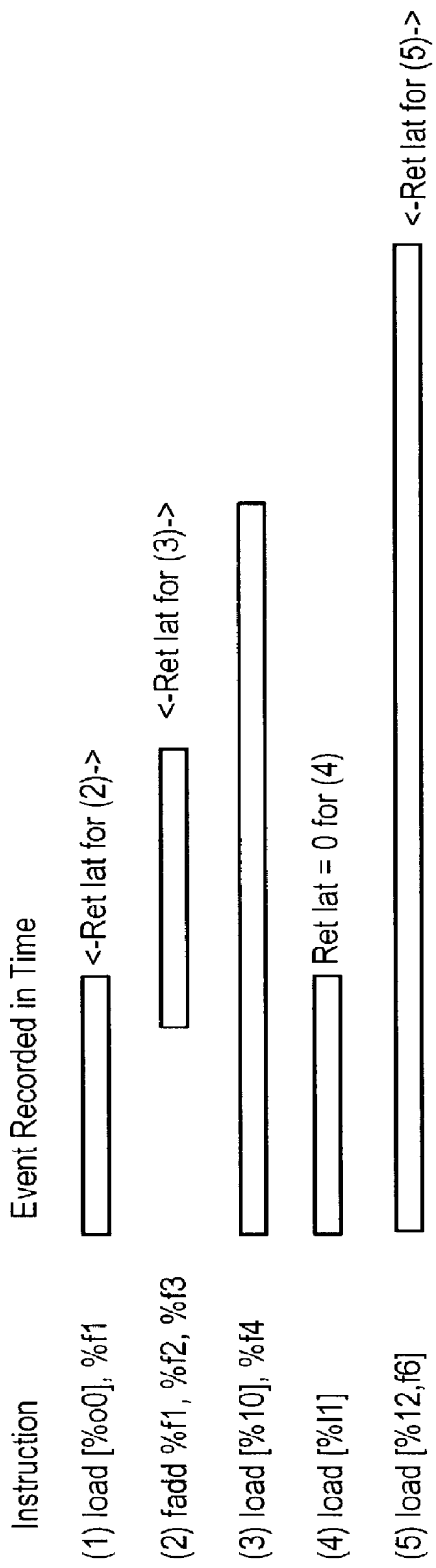
FIG. 5 shows an example of the results from the use of the method for computing overhead.

The overhead is separated into different components based on events that occur during the life cycle of each instruction. FIG. 5 shows an example of the results of the use of this method. For example, if an instruction spends 10% of its execution time on replaying because of Level 2 cache misses and 20% of its execution time on memory disambiguation buffer full condition and 50% of its execution time on Level 3 cache miss, the following breakdown of overhead is provided:

% of L2 cache miss=overhead*10%

% of MBD full replay=overhead*20%

% of L3 cache miss=overhead*50%

% of base execution=20%

This overhead breakdown provides accurate information as well as overall information on the amount of bottleneck in the program.

More specifically, instructions (1), (2), (3), (4) and (5) get inserted into ISW 122. Assume that the load instruction in (1) gets its data from LI Cache 130. Instruction (2) cannot be issued unless instruction (1) is able to bypass its result through register % f1. So, the retired latency (Ret Lat) for instruction (2) is from the completion of (1) to completion of (2). But, instruction (3) is independent of (1) and (2). Hence instruction (3) is issued in parallel with instruction (1). If the load at instruction (3) misses L1 cache 130 and has to wait until it gets a line from L2 Cache 132. So, the retired latency for instruction (3) is the difference in time from when instruction (2) retired to the time when instruction (3) retired. There are no negative retired latencies. If the instruction completes before the previous instruction, then the Ret Lat=0 (e.g., the Ret Lat for instruction (4)=0). Also, the retired latency is calculated from the most recent retired instruction (e.g., the retired latency for instruction (5) is the difference in time from when instruction (3) retired to when instruction (5) retired).

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer implemented method of computing overhead associated with executing instructions of a program on an out-of-order processor comprising:
    determining when a first instruction retires;
    determining when a second instruction retires;
    calculating an overhead based upon subtracting when the first instruction retired from when the second instruction retired; and
    providing for tuning execution of the program by the out-of-order processor as a function of the overhead calculation.

2. The method of claim 1 wherein the calculating an overhead includes calculating a plurality of specific overheads.

3. The method of claim 1 wherein the calculating an overhead includes calculating an overhead associated with a percentage of cycles when a memory disambiguation buffer is full during the execution of the second instruction.

4. The method of claim 1 wherein the calculating an overhead includes calculating an overhead associated with a percentage of cycles when a memory disambiguation buffer is read after write recycled during the execution of the second instruction.

5. The method of claim 1 wherein the calculating an overhead includes calculating an overhead associated with a percentage of cycles when a memory disambiguation buffer performs a partial read after write recycled during the execution of the second instruction.

6. The method of claim 1 wherein the calculating an overhead includes calculating an overhead associated with a percentage of cycles when a store buffer performs a partial read after write recycled during the execution of the second instruction.

7. The method of claim 1 wherein the calculating an overhead includes calculating an overhead associated with a percentage of cycles when a load buffer is full during the execution of the second instruction.

8. The method of claim 1 wherein the calculating an overhead includes calculating an overhead associated with a percentage of cycles when a translation look aside buffer fill event occurred during the execution of the second instruction.

9. The method of claim 1 wherein the calculating an overhead includes calculating an overhead associated with a percentage of cycles when an Over Eager load is recycled during the execution of the second instruction.

10. The method of claim 1 wherein the calculating an overhead includes calculating an overhead associated with a percentage of cycles when a cache bank conflict triggers recycling during the execution of the second instruction.

11. The method of claim 1 wherein the calculating an overhead includes calculating an overhead associated with a percentage of cycles when a translation look aside buffer is busy during the execution of the second instruction.

12. The method of claim 1 wherein the calculating an overhead includes calculating an overhead associated with a percentage of cycles when a load instruction is waiting for data in a cache during the execution of the second instruction.

13. An out-of-order processor apparatus for computing overhead associated with executing instructions of a program on the out-of-order processor comprising:
    means executed by the out-of-order processor for:
        determining when a first instruction retires;
        determining when a second instruction retires;
        calculating an overhead based upon subtracting when the first instruction retired from when the second instruction retired; and
    means for providing for tuning execution of the program by the out-of-order processor as a function of the overhead calculation.

14. The apparatus of claim 13 wherein the means for calculating an overhead includes means for calculating a plurality of specific overheads.

15. The apparatus of claim 13 wherein the means for calculating an overhead includes means for calculating an overhead associated with a percentage of cycles when a memory disambiguation buffer is full during the execution of the second instruction.

16. The apparatus of claim 13 wherein the means for calculating an overhead includes means for calculating an overhead associated with a percentage of cycles when a memory disambiguation buffer is read after write recycled during the execution of the second instruction.

17. The apparatus of claim 13 wherein the means for calculating an overhead includes means for calculating an overhead associated with a percentage of cycles when a memory disambiguation buffer performs a partial read after write recycled during the execution of the second instruction.

18. The apparatus of claim 13 wherein the means for calculating an overhead includes means for calculating an overhead associated with a percentage of cycles when a store buffer performs a partial read after write recycled during the execution of the second instruction.

19. The apparatus of claim 13 wherein the means for calculating an overhead includes means for calculating an overhead associated with a percentage of cycles when a load buffer is full during the execution of the second instruction.

20. The apparatus of claim 13 wherein the means for calculating an overhead includes means for calculating an overhead associated with a percentage of cycles when a translation look aside buffer fill event occurred during the execution of the second instruction.

21. The apparatus of claim 13 wherein the means for calculating an overhead includes means for calculating an overhead associated with a percentage of cycles when an Over Eager load is recycled during the execution of the second instruction.

22. The apparatus of claim 13 wherein the means for calculating an overhead includes means for calculating an overhead associated with a percentage of cycles when a cache bank conflict triggers recycling during the execution of the second instruction.

23. The apparatus of claim 13 wherein the means for calculating an overhead includes means for calculating an overhead associated with a percentage of cycles when a translation look aside buffer is busy during the execution of the second instruction.

24. The apparatus of claim 13 wherein the means for calculating an overhead includes means for calculating an overhead associated with a percentage of cycles when a load instruction is waiting for data in a cache during the execution of the second instruction.

25. A computer implemented system for computing overhead associated with executing instructions of a program on an out-of-order processor comprising:
the out-of-order processor executing modules of the following:
a first determining module, the first determining module determining when a first instruction retires;
a second determining module, the second determining module determining when a second instruction retires;
an overhead calculating module, the overhead calculating module calculating an overhead based upon subtracting when the first instruction retired from when the second instruction retired; and
wherein the overhead calculation provides for tuning execution of the program by the out-of-order processor as a function of the overhead calculation.

26. The system of claim 25 wherein the overhead calculating module includes modules for calculating a plurality of specific overheads.

27. The system of claim 25 wherein the overhead calculating module includes a disambiguation buffer calculating module, the disambiguation buffer calculating module calculating an overhead associated with a percentage of cycles when a memory disambiguation buffer is full during the execution of the second instruction.

28. The system of claim 25 wherein the overhead calculating module includes a read after write recycled calculating module, the read after write recycled calculating module calculating an overhead associated with a percentage of cycles when a memory disambiguation buffer is read after write recycled during the execution of the second instruction.

29. The system of claim 25 wherein the overhead calculating module includes a partial read after write recycled calculating module, the partial read after write recycled calculating module calculating an overhead associated with a percentage of cycles when a memory disambiguation buffer performs a partial read after write recycled during the execution of the second instruction.

30. The system of claim 25 wherein the overhead calculating module includes a store buffer calculating module, the store buffer calculating module calculating an overhead associated with a percentage of cycles when a store buffer performs a partial read after write recycled during the execution of the second instruction.

31. The system of claim 25 wherein the overhead calculating module includes a load buffer calculating module, the load buffer calculating module calculating an overhead associated with a percentage of cycles when a load buffer is full during the execution of the second instruction.

32. The system of claim 25 wherein the overhead calculating module includes a translation look aside buffer calculating module, the translation look aside buffer calculating module calculating an overhead associated with a percentage of cycles when a translation look aside buffer fill event occurred during the execution of the second instruction.

33. The system of claim 25 wherein the overhead calculating module includes an over eager load calculating module, the over eager load calculating module calculating an overhead associated with a percentage of cycles when an Over Eager load is recycled during the execution of the second instruction.

34. The system of claim 25 wherein the overhead calculating module include a cache bank conflict calculating module, the cache bank conflict calculating module calculating an overhead associated with a percentage of cycles when a cache bank conflict triggers recycling during the execution of the second instruction.

35. The system of claim 25 wherein the overhead calculating module includes a busy translation look aside buffer calculating module, the busy translation look aside buffer calculating module calculating an overhead associated with a percentage of cycles when a translation look aside buffer is busy during the execution of the second instruction.

36. The system of claim 25 wherein the overhead calculating module includes a load instruction waiting calculating module, the load instruction waiting calculating module calculating an overhead associated with a percentage of cycles when a load instruction is waiting for data in a cache during the execution of the second instruction.

* * * * *